(12) United States Patent
Grimminger et al.

(10) Patent No.: US 10,132,547 B2
(45) Date of Patent: Nov. 20, 2018

(54) REFRIGERATING DEVICE WITH A CAMERA MODULE

(71) Applicant: BSH HAUSGERAETE GMBH, Munich (DE)

(72) Inventors: Jochen Grimminger, Tapfheim (DE); Stephan Kempfle, Ellzee (DE); Hans Peter Werner, Giengen (DE); Gerhard Wetzel, Sontheim (DE)

(73) Assignee: BSH Hausgeraete GmbH, Munich (DE)

( * ) Notice: Subject to any disclaimer, the term of this patent is extended or adjusted under 35 U.S.C. 154(b) by 175 days.

(21) Appl. No.: 14/910,337

(22) PCT Filed: Aug. 13, 2014

(86) PCT No.: PCT/EP2014/067366
§ 371 (c)(1),
(2) Date: Feb. 5, 2016

(87) PCT Pub. No.: WO2015/024841
PCT Pub. Date: Feb. 26, 2015

(65) Prior Publication Data
US 2016/0178263 A1 Jun. 23, 2016

(30) Foreign Application Priority Data

Aug. 23, 2013 (DE) .................. 10 2013 216 762

(51) Int. Cl.
*G06K 9/20* (2006.01)
*F25D 11/00* (2006.01)
(Continued)

(52) U.S. Cl.
CPC ............ *F25D 11/00* (2013.01); *F25D 23/065* (2013.01); *F25D 27/00* (2013.01); *F25D 29/00* (2013.01);
(Continued)

(58) Field of Classification Search
CPC .... F25D 29/00; F25D 2500/06; F25D 23/065; F25D 27/00; F25D 11/00; H04N 5/2628; H04N 5/2256; G06T 5/006; G06K 9/2054
See application file for complete search history.

(56) References Cited

U.S. PATENT DOCUMENTS 5,691,684 A * 11/1997 Murrah ................ G06Q 10/087
235/385
6,141,034 A * 10/2000 McCutchen ........... G02B 27/22
348/36
(Continued)

FOREIGN PATENT DOCUMENTS

JP 2003207258 A 7/2003
JP 2004183987 A 7/2004
(Continued)

*Primary Examiner* — Sathyanaraya V Perungavoor
*Assistant Examiner* — Philip P. Dang
(74) *Attorney, Agent, or Firm* — Laurence A. Greenberg; Werner H. Stemer; Ralph E. Locher

(57) ABSTRACT

A refrigerating device includes a camera module for capturing a first digital image with markings in the interior of the refrigerating device. The refrigerating device includes a processing device which is configured to convert the first digital image into a second digital image on the basis of the captured markings.

15 Claims, 5 Drawing Sheets

(51) Int. Cl.
  *F25D 29/00* (2006.01)
  *G06T 5/00* (2006.01)
  *F25D 23/06* (2006.01)
  *F25D 27/00* (2006.01)
  *H04N 5/225* (2006.01)
  *H04N 5/262* (2006.01)

(52) U.S. Cl.
  CPC ............ *G06K 9/2054* (2013.01); *G06T 5/006* (2013.01); *H04N 5/2256* (2013.01); *H04N 5/2628* (2013.01); *F25D 2500/06* (2013.01)

(56) References Cited

U.S. PATENT DOCUMENTS

| | | | |
|---|---|---|---|
| 6,741,523 B1 * | 5/2004 | Bommarito | G01K 3/04 116/220 |
| 6,954,290 B1 | 10/2005 | Braudaway et al. | |
| 7,200,511 B2 * | 4/2007 | Damrath | G06K 9/00 702/127 |
| 7,760,905 B2 * | 7/2010 | Rhoads | G06F 3/017 382/100 |
| 7,796,675 B1 * | 9/2010 | Carter | G08B 25/009 375/130 |
| 7,979,877 B2 * | 7/2011 | Huber | G06Q 30/02 725/32 |
| 8,083,588 B2 * | 12/2011 | Pryor | A63F 13/00 345/156 |
| 8,287,374 B2 * | 10/2012 | Pryor | A63F 3/00643 463/30 |
| 8,447,067 B2 * | 5/2013 | Rhoads | G06Q 10/083 382/100 |
| 8,457,449 B2 * | 6/2013 | Rhoads | G06F 3/017 382/317 |
| 2001/0010516 A1 * | 8/2001 | Roh | F25D 29/00 345/169 |
| 2006/0096303 A1 | 5/2006 | Kavounas | |
| 2008/0104976 A1 * | 5/2008 | Guglielmetti | F25D 29/001 62/127 |
| 2010/0045816 A1 * | 2/2010 | Rhoads | G06K 9/228 348/222.1 |
| 2010/0170289 A1 | 7/2010 | Graziano | |
| 2010/0214423 A1 * | 8/2010 | Ogawa | H04N 5/23248 348/208.4 |
| 2010/0231506 A1 * | 9/2010 | Pryor | G01F 23/292 345/156 |
| 2010/0283573 A1 * | 11/2010 | Yum | F25D 29/00 340/3.1 |
| 2012/0138629 A1 | 6/2012 | Ashrafzadeh et al. | |
| 2012/0190386 A1 * | 7/2012 | Anderson | G01C 15/04 455/456.3 |
| 2013/0024293 A1 * | 1/2013 | Tinsman | G06Q 30/0275 705/14.68 |
| 2013/0031582 A1 * | 1/2013 | Tinsman | H04N 21/2353 725/36 |
| 2013/0085935 A1 * | 4/2013 | Nepomniachtchi | G06Q 20/322 705/40 |
| 2013/0207101 A1 * | 8/2013 | Yamazaki | H01L 29/41733 257/43 |

FOREIGN PATENT DOCUMENTS

| | | |
|---|---|---|
| JP | 2012251724 A | 12/2012 |
| KR | 20010037549 A | 5/2001 |

* cited by examiner

REFRIGERATING DEVICE WITH A CAMERA MODULE

BACKGROUND OF THE INVENTION

Field of the Invention

The present invention relates to a refrigerating device with a camera module for capturing a first digital image with markings in the interior of an inner container.

BRIEF SUMMARY OF THE INVENTION

The object underlying the invention is to specify a refrigerating device in which images captured from different angles of view can be compared with one another.

This object is achieved by the subject matter with the features described below. Advantageous forms of embodiment of the invention are the subject matter of the figures and the description provided below.

In accordance with one aspect of the invention this object is achieved by a refrigeration device with a camera module for capturing a first digital image with markings in the interior of the refrigerating device, in which the refrigerating device includes a processing device which is embodied to convert the first digital image into a second digital image on the basis of the markings captured. The technical advantage achieved by this for example is that these markings define an image area that remains the same in the interior of the inner container, even if the images are captured from different angles. This enables a uniform image area to be defined in the interior of the inner container, so that the image areas captured from different angles can be compared afterwards.

A refrigerating device is especially to be understood as a household refrigerating device, i.e. a refrigerating device which is used for household management in households or in the gastronomy area, and especially serves to store foodstuffs or drinks at specific temperatures, such as a refrigerator, a freezer, a fridge/freezer combination, a chest freezer or a wine cooler cabinet.

In an advantageous embodiment of the refrigerating device the markings are formed by projections with geometrical shapes in the interior of an inner container of the refrigerating device. The technical advantage achieved by this for example is that the markings can be identified in a simple manner in the capture of the first digital image.

In a further advantageous form of embodiment of the refrigerating device the markings are formed by edges in the interior of the inner container. The technical advantage achieved by this for example is that the markings can be integrated in a simple manner into the inner container.

In a further advantageous form of embodiment of the refrigerating device the markings differ in color from the inner container of the refrigerating device. The technical advantage achieved by this for example is that the markings can be identified in a simple manner in the capture of the first digital image.

In a further advantageous form of embodiment of the refrigerating device the inner container of the refrigerating device includes four markings that define a rectangular area in the interior of the inner container. The technical advantage achieved by this for example is that a rectangular area can be compared in the interior of the inner container.

In a further advantageous form of embodiment of the refrigerating device the markings are triangular in shape. The technical advantage achieved by this for example is that the accuracy of an image analysis is improved by the corners of the triangles.

In a further advantageous form of embodiment of the refrigerating device the markings are retroreflectors. The technical advantage achieved by this for example is that the markings can be identified in an especially simple manner in the capture of the first digital image.

In a further advantageous form of embodiment of the refrigerating device the refrigerating device includes an illumination device, which is disposed in the vicinity of the camera module. The technical advantage achieved by this for example is that the retroreflectors throw the light into the camera module.

In a further advantageous form of embodiment of the refrigerating device the illumination device comprises a flash device. The technical advantage achieved by this for example is that the contrast and the brightness of the captured image are improved.

In a further advantageous form of embodiment of the refrigerating device the processing device is embodied to remove an edge area of the first digital image on the basis of the markings, in order to obtain the second digital image. The technical advantage achieved by this for example is that an image crop that remains the same is obtained.

In a further advantageous form of embodiment of the refrigerating device the processing device is embodied to change an image size of the first digital image on the basis of the markings, in order to obtain the second digital image. The technical advantage achieved by this for example is that the images can be placed above one another in order to compare the captured images from different angles.

In a further advantageous form of embodiment of the refrigerating device the processing device is embodied to adapt an image resolution of the first digital image on the basis of the markings, in order to obtain the second digital image. The technical advantage achieved by this for example is that the resolution of the captured images can be unified.

In a further advantageous form of embodiment of the refrigerating device the processing device is embodied to select an image crop of the first digital image on the basis of the markings, in order to obtain the second digital image. The technical advantage achieved by this for example is that an image crop that remains the same can be obtained.

In a further advantageous form of embodiment of the refrigerating device the processing device is embodied to carry out an image rotation of the first digital image on the basis of the markings, in order to obtain the second digital image. The technical advantage achieved by this for example is that a rotation of the camera module can be compensated for.

In a further advantageous form of embodiment of the refrigerating device the processing device is embodied to apply a trapezoidal filter or a distortion filter on the basis of the markings. The technical advantage likewise achieved by this for example is that a rotation of the camera module can be compensated for.

Exemplary embodiments of the invention are shown in the drawings and are explained in greater detail below.

DESCRIPTION OF THE INVENTION

Figure 1:
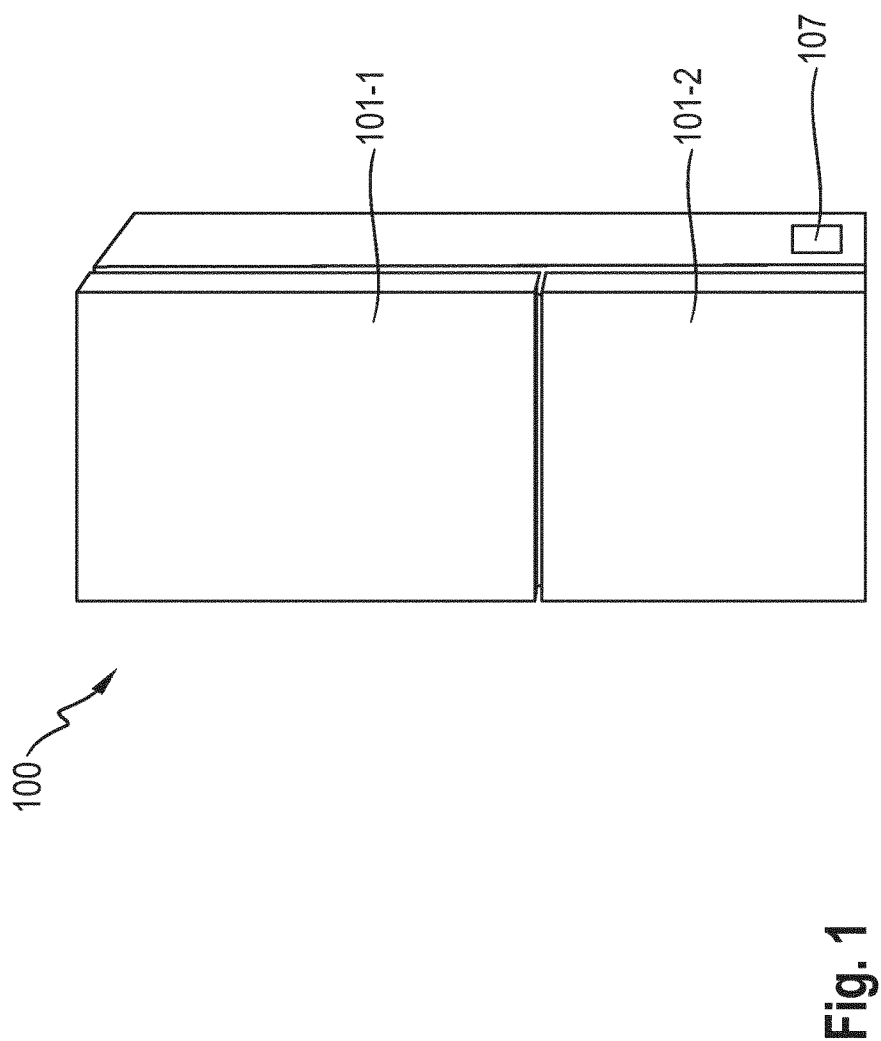
FIG. 1 shows a schematic view of a refrigerating device.

FIG. 1 shows a refrigerator, representing a refrigerating device 100 in general, with an upper refrigerating device door 101-1 and a lower refrigerating device door 101-2. The refrigerator is used for example for cooling of foodstuffs and includes a cooling circuit with an evaporator, a compressor, a condenser and a choke element. The evaporator is a heat exchanger, in which, after its expansion, the liquid coolant is evaporated by taking up heat from the medium to be cooled, i.e. the air inside the refrigerator.

The compressor is a mechanically-operated component, which sucks up coolant vapor from the evaporator and expels it at high pressure to the condenser. The condenser is a heat exchanger, in which, after its compression, the liquid coolant is condensed by emitting heat to an external cooling medium, i.e. the surrounding air. The choke is a device for permanently reducing the pressure by narrowing the cross section.

The coolant is a fluid that is used for heat transfer in the refrigerating system, which, at low temperatures and low pressure of the fluid, takes up heat, and at higher temperature and higher pressure of the fluid, emits heat, wherein this process usually involves changes in the state of the fluid.

The refrigerating device 100 includes a processing device 107 that is capable of electronically processing data of the refrigerating device. The processing device 107 is for example an electrical circuit with a processor and a memory.

Figure 2:
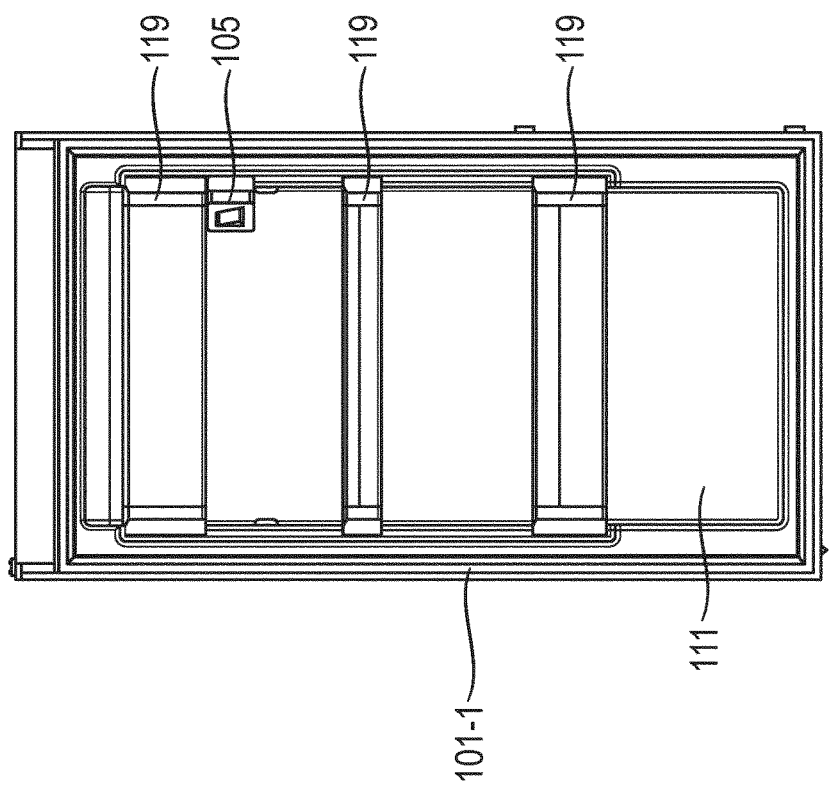
FIG. 2 shows an internal view of a refrigerating device door with camera module.

FIG. 2 shows an internal view of a refrigerating device door 101-1 with a camera module 105. The camera module 105 is a digital image capture module, such as a Windows webcam for example, that is capable of capturing the inside of an inner container or of the refrigerating device door 101-1 and recording it as an image. The camera module 105 comprises a standard lens for example, which can be interchanged via a screw thread fitting. The camera module 105 is triggered via an electrical triggering line, so that the capture is initiated at the triggering point. When the refrigerating device door 101-1 is opened and closed the camera module 105 captures images of the inner container from different angles.

The camera module 105 is disposed below the upper door shelf 119. The mechanical positioning of the camera module 105 in the refrigerating device door 101-1 is such that the capture direction is not obstructed by objects stored in the refrigerating device door 101-1. The capture direction of the camera module 105 is inclined in relation to the inner door plate 111 of the refrigerating device door 101-1. The camera module 105 is disposed in the refrigerating device door 101 in the vicinity of the front edge of the door shelf 119 and an outer edge of a door pillar of the refrigerating device door 101.

Figure 3:
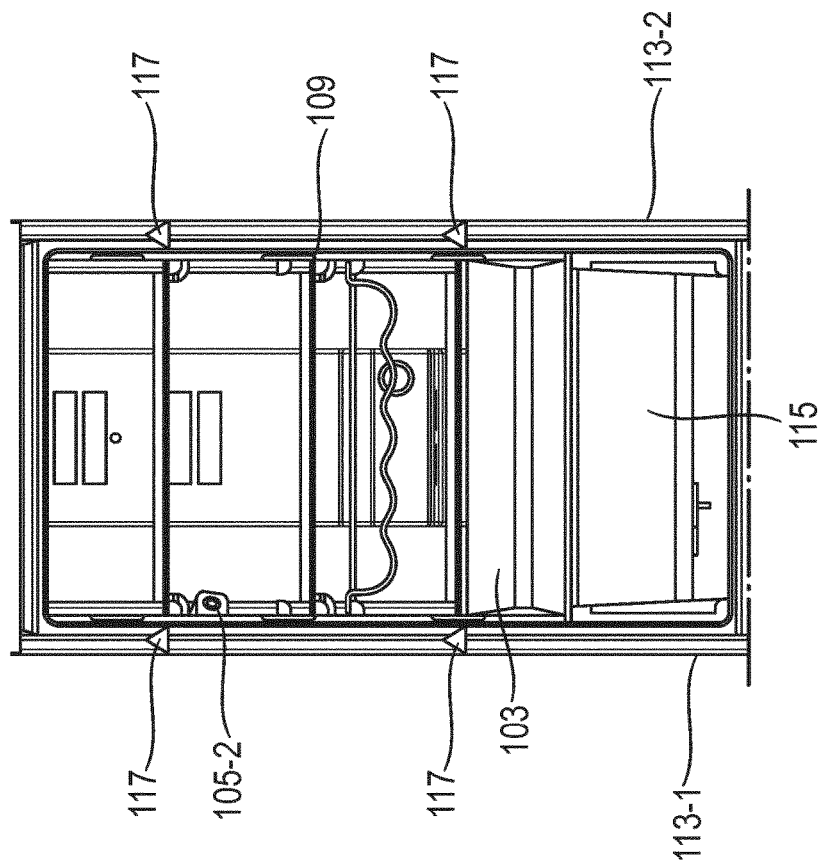
FIG. 3 shows a front view of the interior of the inner container with markings.

FIG. 3 shows a front view of the inside of the inner container 103 with markings 117. Disposed in the inner container 103 are the shelves 109, which form a further storage area for refrigerated goods in the refrigerating device door 101. The shelves 109 form a cover, an intermediate shelf or a part of a drawer and can be used as storage surfaces for refrigerated goods.

The inner container 103 comprises the side walls 113-1 and 113-2. The refrigerating device door 101 closes against the side wall 113-2. The side wall 113-1 lies opposite the side wall 113-2 with the refrigerating device door 101. The rear side of the inner container 103 is delimited by a rear wall 115.

Disposed below the upper shelf 109 is a further camera module 105-2, which is capable of recording images of the refrigerating device door 101. The mechanical positioning of the camera module 105 in the inner container 103 is such that the capture direction is not obstructed by objects stored on the shelf 109. In addition the arrangement and design of the door shelf 119 is such that it is impossible for the line of sight to be obstructed by refrigerated goods.

The camera modules 105 capture an image of an interior of the refrigerating device 100 from different angles of view. In such cases, depending on the angle of view, the result is a different distortion of the captured image. In order to compensate for the distortion, the processing device 107 is embodied such that predetermined markings 117 that are located inside the refrigerating device are identified in the image captured. In the subsequent processing the markings 117 are then used for example to crop the image to the area that is defined by the markings 117.

The markings 117 are formed for example by geometrical shapes inside the refrigerating device 100, such as for example edges running horizontally or vertically or glued-on triangles. The markings 117 can be highlighted by a specific color, so that said markings can be identified in a simple manner by color analysis. For example a rectangular area inside the inner container 103, which is reproduced in the image captured by the camera module 105, can be defined by the markings 117.

The markings 117 can also be formed by retroreflectors, which reflect back in the same direction the light that strikes them. If the refrigerating device includes an illumination device, which is disposed in the vicinity of the camera module 105, areas appearing bright in the captured image in which the markings 117 are disposed are recognizable. The illumination device comprises a flash device for example, so that an image of the inside of the refrigerating device can be recorded with high brightness.

The camera module 105 captures a digital image inside the refrigerating device 100 in which the markings 117 are to be recognized. The processing device 107 analyzes the digital image of the captured image and identifies the markings 117 shown in this image. In the subsequent image processing the processing device 107 is capable of removing an edge area of the digital image based on the marking 117, in order to obtain a further digital image. The processing device 107 can also change an image size of the digital image on the basis of the markings 117 or adapt an image resolution of the digital image on the basis of the markings 117, in order to obtain a further digital image. The processing device 107 can select a section of the digital image on the basis of the markings 117 or carry out a rotation of the digital image on the basis of the markings 117. In addition a trapezoidal filter or a distortion filter can be applied to the digital image on the basis of the markings 117.

The markings 117 and the processing device 107 enable images captured by the camera module 105, which have been obtained from different angles, to be adapted and have distortion removed from them. In particular different refrigerating space crops can be compensated for at different angular speeds of the refrigerating device door 101-1.

Figure 4:
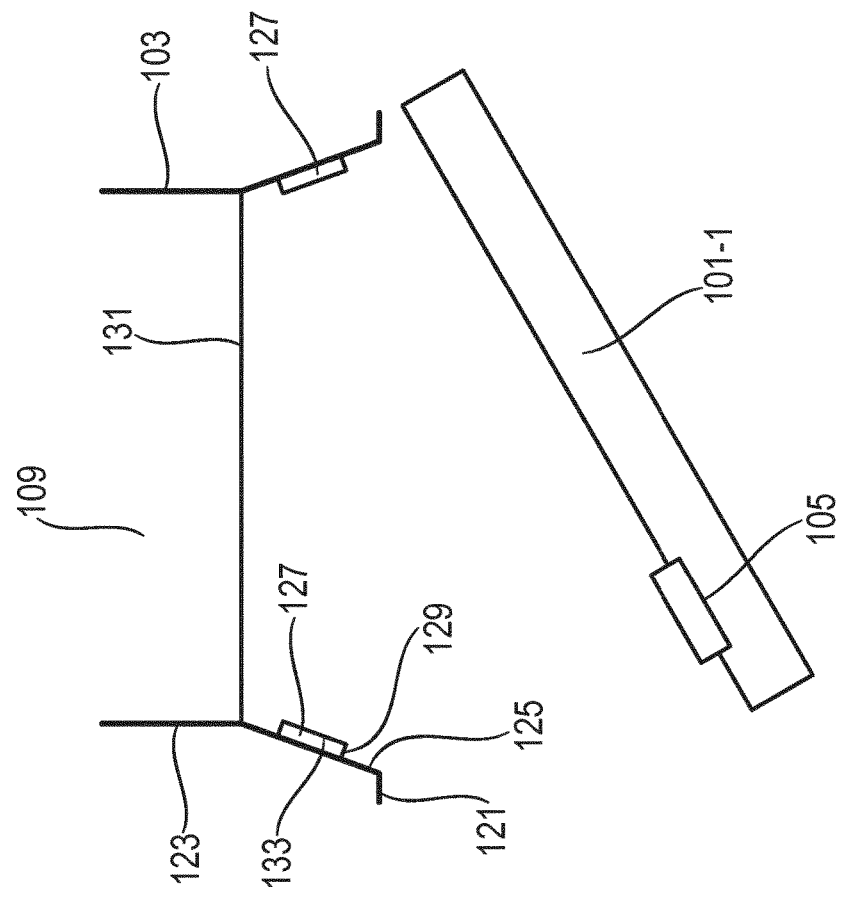
FIG. 4 shows a cross-sectional view through the refrigerating device.

FIG. 4 shows a cross-sectional view through the refrigerating device 100. The inner container 103 has a front side 121, which forms an edge for a seal of the refrigerating device door 101-1. An angled wall 125 of the inner container 103, which includes a light 127, closes against the front side 121. The angled wall 125 runs at an angle into the inside of the inner container 103. A side wall 123 of the inner container 103 closes against the angled wall 125. The shelf 109, which has a front edge 131, is inserted inside the inner container 103. The shelf 109 is supported on the side wall 123 of the inner container 103.

The light 127 in the angled wall 125 has a square or rectangular shape. This means that the light has a vertical side edge 129 and a horizontal side edge 133. The horizontal and the vertical side edge 133 and 129 of the light form marking lines as markings 117. The illuminated horizontal and vertical side edge 133 and 129 of the light 127 can be captured by the camera module 105 in a simple manner and can be identified by the processing device 107 because of the strong contrast. This enables reference points to be identified in a simple manner.

Figure 5:
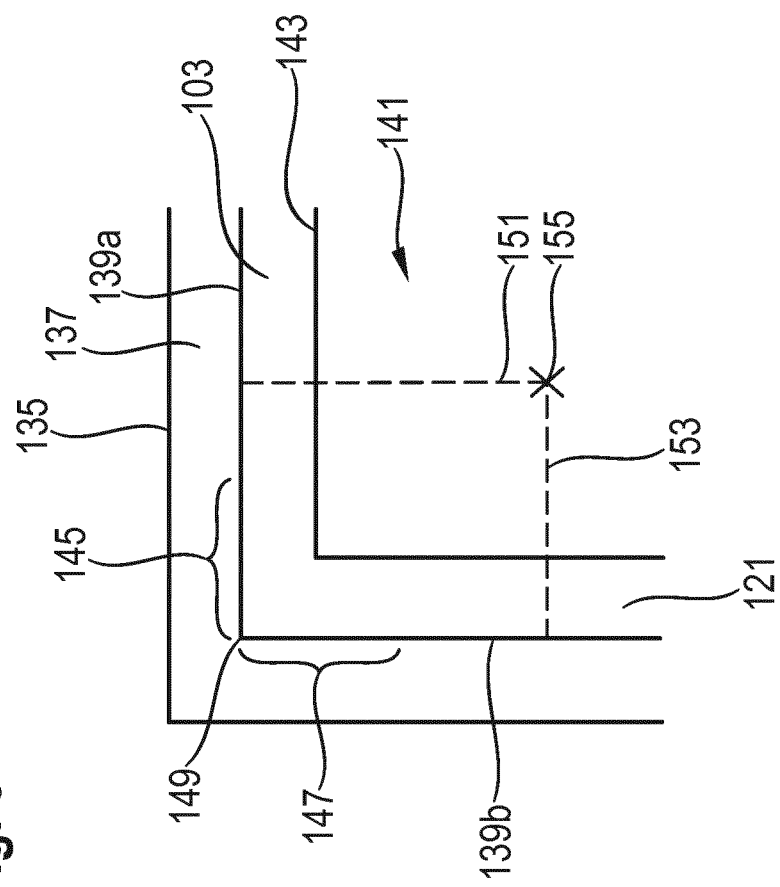
FIG. 5 shows a further front view of the inner container.

FIG. 5 shows a further front view of an inner container 103. Located inside the inner container 103 is the storage space 141 for the refrigerated goods, which is delimited to the side by an inner wall 143.

Formed around the outside of the inner container 103 of the refrigerating device 100 is a metal housing with an outer wall 135 and a front wall 137. The surface of the front edge 137 is angled so that it is flush with the front side 121 of the inner container 103. The front edge 137 of the outer wall 135 adjoins the inner container 103. The transition between the metallic front edge 137 and the inner container 103 made of white plastic forms a sharp horizontal marking line 139a and a vertical marking line 139b, which can be detected in a simple manner by the camera module 105. The marking lines 139a and 139b cannot be obstructed by refrigerated goods.

In the upper and side edge area 145 and 147 the marking lines 139a and 139b form a right angle, which can be identified in a simple manner in the image captured by the camera module 105. The corner point 149 of the right angle forms a reference point.

The corner point 149 and the marking lines 139a and 139b enable a coordinate system to be defined inside the inner container 103. The distance 151 forms the shortest line to the upper marking line 139a. The distance 153 forms the shortest connection to the side marking line 139b. The distances 151 and 153 enable the coordinates of the example point 155 in the interior of the inner container 103 to be specified. The distances 151 and 153 can be expressed in image pixels.

All features explained and shown in connection with individual forms of embodiment of the invention can be provided in a different combination in the inventive subject matter, in order at the same time to realize its advantageous effects.

The scope of protection of the present invention is given by the claims and is not restricted by the features explained in the description or shown in the figures.

LIST OF REFERENCE CHARACTERS

100 Refrigerating device
101-1 Refrigerating device door
101-2 Refrigerating device door
103 Inner container
105 Camera module
107 Processing device
109 Shelf
111 Inner door plate
113-1 Side wall
113-2 Side wall
115 Rear wall
117 Markings
119 Door shelf
121 Front side
123 Side wall
125 Angled wall
127 Light
129 Vertical side edge
131 Front edge
133 Horizontal side edge
135 Outer wall
137 Front wall
139a Marking line
139b Marking line
141 Storage space
143 Inner wall
145 Corner area
147 Corner area
149 Corner point
151 Distance
153 Distance
155 Example point

The invention claimed is:

1. A refrigerating device, comprising:
an inner container defining a refrigerating device interior;
a refrigerating device door enclosing said refrigerating device interior;
markings disposed in said refrigerating device interior;
a camera module for capturing a first digital image including said markings;
an electrical triggering line triggering said camera module for initiating image capturing at a triggering point and capturing images of said inner container from different angles upon said refrigerating device door being opening or closed; and
a processing device configured to convert said first digital image into a second digital image on a basis of said captured markings;
said processing device analyzing a digital image of said captured image and identifying said markings;
said processing device using said markings to crop said image to an area defined by said markings; and
said markings and said processing device enabling images captured by said camera module and obtained from different angles to be adapted and to have distortion removed from said captured images permitting different refrigerating space crops to be compensated for at different angular speeds of said refrigerating device door.

2. The refrigerating device according to claim 1, which further comprises an inner refrigerating device container, said markings being formed by projections having geometrical shapes inside said inner container.

3. The refrigerating device according to claim 2, wherein said markings are formed by edges inside said inner container.

4. The refrigerating device according to claim 2, wherein said markings differ in color from said inner container.

5. The refrigerating device according to claim 2, wherein said markings include four markings defining a rectangular area inside said inner container.

6. The refrigerating device according to claim 1, wherein said markings are triangular in shape.

7. The refrigerating device according to claim 2, wherein said markings are retroreflectors.

8. The refrigerating device according to claim 1, which further comprises an illumination device disposed in a vicinity of said camera module.

9. The refrigerating device according to claim 8, wherein said illumination device includes a flash device.

10. The refrigerating device according to claim 1, wherein said processing device is configured to remove an edge area of said first digital image on the basis of said markings, in order to obtain said second digital image.

11. The refrigerating device according to claim 1, wherein said processing device is configured to change an image size of said first digital image on the basis of said markings, in order to obtain said second digital image.

12. The refrigerating device according to claim 1, wherein said processing device is configured to adapt an image resolution of said first digital image on the basis of said markings, in order to obtain said second digital image.

13. The refrigerating device according to claim 1, wherein said processing device is configured to select an image crop of said first digital image on the basis of said markings, in order to obtain said second digital image.

14. The refrigerating device according to claim 1, wherein said processing device is configured to carry out an image rotation of said first digital image on the basis of said markings, in order to obtain said second digital image.

15. The refrigerating device according to claim 1, wherein said processing device is configured to apply at least one of a trapezoidal filter or a distortion filter on the basis of said markings.

* * * * *